United States Patent [19]
Herrington

[11] Patent Number: 4,885,196
[45] Date of Patent: Dec. 5, 1989

[54] THREE-LAYER CROSS-LAMINATED FILM WITH FOAM CORE MADE BY COUNTER-ROTATING DIES

[75] Inventor: Fox J. Herrington, Holcomb, N.Y.

[73] Assignee: Mobil Oil Corporation, New York, N.Y.

[21] Appl. No.: 203,183

[22] Filed: Jun. 7, 1988

[51] Int. Cl.$^4$ .................. B32B 5/20; B29C 67/22; B29C 47/06

[52] U.S. Cl. ............................ 428/36.5; 264/45.9; 264/171; 264/565; 425/133.1; 425/133.5; 425/817 C; 428/317.1; 428/317.7; 428/910

[58] Field of Search .................. 264/45.9, 171, 565; 425/133.1, 133.5; 428/317.1, 317.7, 910, 36.5

[56] References Cited

U.S. PATENT DOCUMENTS

| | | |
|---|---|---|
| 3,342,657 | 9/1967 | Dyer . |
| 3,471,353 | 10/1969 | Rasmussen . |
| 3,508,944 | 4/1970 | Henderson et al. . |
| 3,649,143 | 3/1972 | Papesh et al. . |
| 3,891,374 | 6/1975 | Ninomiya et al. . |
| 3,894,907 | 7/1975 | Sudo . |
| 3,926,706 | 12/1975 | Reifenhauser et al. . |
| 3,983,285 | 9/1976 | Riboulet et al. . |
| 4,009,975 | 3/1977 | Ninomiya et al. . |
| 4,011,128 | 3/1977 | Suzuki . |
| 4,039,364 | 8/1977 | Rasmussen . |
| 4,084,028 | 4/1978 | Rasmussen . |
| 4,420,451 | 12/1983 | Rasmussen . |
| 4,474,634 | 10/1984 | Hiraoka et al. . |
| 4,496,413 | 1/1985 | Sharps, Jr. . |

*Primary Examiner*—Philip Anderson
*Attorney, Agent, or Firm*—Alexander J. McKillop; Charles J. Speciale

[57] ABSTRACT

A high-strength cross-laminated film with a foam core, particularly a cross-laminated film made by counter-rotating dies, and a method of producing the laminated film. The high-strength cross-laminated tubular film web is produced by counter-rotating dies; which will allow for the orientation of each extruded film layer in a different direction so as to form a cross-laminate, and whereby, concurrently with the extrusion of the molten layers, there is interposed a formed adhesive material polymer between the layers so as to provide a weak bonding or adherence therebetween while imparting a thick feel to the laminated film.

26 Claims, 2 Drawing Sheets

4,885,196

THREE-LAYER CROSS-LAMINATED FILM WITH FOAM CORE MADE BY COUNTER-ROTATING DIES

BACKGROUND OF THE INVENTION

1. Field of the Invention

The present invention relates to a high-strength cross-laminated film, particularly a three-layer cross-laminated film with a foam core which is made by counter-rotating dies, and to a method of producing the laminated film.

In industry, a widespread need has arisen for the provision of extremely strong thermoplastic film webs which are possessed of a high degree of strength in different directions of the film webs, particularly when such film webs are employed in the manufacture of bags or the like. Moreover, in the production of various kinds of consumer products utilizing films of the type considered herein, limitations are encountered in the gauge reduction which can be effected, irrespective of the strength of the film, inasmuch as the feel and perception of a thin film by a consumer is frequently deemed to be undesirable. Consequently, from the standpoint of providing a product which is aesthetically and textually attractive to consumers, the employment of a foamed material for the center layer of a three-layer thermoplastic film material will substantially increase overall thickness of the film for a given amount of material, there creating the perception in a consumer of the presence of a thicker and stronger film, and with an attendant enhancement in the sales appeal of such a product.

Generally, a uniaxially oriented thermoplastic film, for example, a film which is constituted from a high density polyethylene, is extremely strong in one direction of orientation, for instance, in the machine direction of the film web, and very weak in another direction of the film. This renders the film susceptible to tearing along the direction of the orientation, but of a high strength and almost impossible to tear transversely of the direction of film orientation. In order to impart a thermoplastic film, particularly a high-strength laminated film, with an extremely strong film structure in various directions across the film, two layers of such a film can be laminated with the directions of orientation of the respective film layers being either crossed or extending in different directions of orientations. Each film layer imparts a high degree of strength to the laminate across its particular direction of orientation. However, it is generally desired in the laminated film structure that the two film layers not be rigidly adhered or tightly bonded, inasmuch as such a tight bonding or adherence causes any force encountered at the notch of a tear be concentrated within a very small area of the opposite bonded film layer, thereby resulting in a high stress and attendant film failure.

2. Discussion of the Prior Art

Various types of methods and apparatus have been developed in the thermoplastic film producing technology for the formation of cross-laminated thermoplastic films which, in general, possess a relatively high strength in different directions of film orientation. However, such films are usually expensive to manufacture in that they necessitate the utilization of complex apparatus and production methods.

Thus, in the known so-called Valeron process, Van Leer Plastics, an extremely strong laminated film is produced in that a uniaxially-oriented high density polyethylene film is extended through a tubular die, and thereafter slit and wound, as a consequence of which the primary orientation of the film becomes diagonal. Thereafter, when two layers of such films are superimposed and laminated and bonded together with a soft, extendable adhesive, with the axes of orientation of the film layers being crossed, the result is the formation of a high-strength cross-laminated thermoplastic film. However, this particular prior art process is expensive and, as a general premise, commercially uneconomical inasmuch as it necessitates the implementation of a multiplicity of complex manufacturing steps; moreover, it requires the use of a relatively heavy minimum film thickness due to the necessity of having to form multiple layers each of which must be of a reasonable thickness; and the resultant product is a flat sheet which, in order to form it into a bag, necessitates both back and end sealing, neither of which can be a heat seal inasmuch as this would tend to destroy the orientation of the film layers.

Sharps, Jr. U.S. Pat. No. 4,496,413 relates to a method of forming a blocked cross-plied polymer film in which there is no bonding between the film layers through the interposition of a soft, foamed adhesive material as in the present invention.

Rasmussen U.S. Pat. No. 3,471,353 discloses a method and apparatus for bonding oriented flexible sheet materials having the different directions of orientation, and in which the film layers are united through the interposition of a vaporized solvent and the subsequent utilization of heat. This to some extent provides a rigidly bonded film which is subject to the disadvantages described hereinabove encountered during the notching of such laminated film sheets. Moreover, the application of heat frequently destroys the effect of the cross-lamination of the film web.

Other apparatus and methods for producing cross-laminated thermoplastic film webs are disclosed in Sudo U.S. Pat. No. 3,853,661; Reifenhauser, et al. U.S. Pat. No. 3,926,706; Dyer U.S. Pat. No. 3,342,657; Suzuki U.S. Pat. No. 4,011,1281; Rasmussen U.S. Pat. Nos. 4,039,364 and 4,420,451; and Papesh, et al. U.S. Pat. No. 3,649,143. However, none of these publications provide for a lamination with a soft, extendable adhesive as contemplated by the present invention, and with the utilization of counter-rotating extrusion dies.

Pursuant to a more recent development by the present inventor, as set forth in copending U.S. Pat. No. Appln. No. 145,011, filed on Jan. 19, 1988, entitled HIGH-STRENGTH CROSS-LAMINATED FILM MADE BY COUNTER-ROTATING DIES, which is commonly assigned to the assignee of this application, there is contemplated the provision of a high-strength cross-laminated tubular film web which is produced by counter-rotating dies; the latter of which will allow for the orientation of each extruded film layer in a different direction so as to form a cross-laminate, and whereby, concurrently with the extrusion of the molten polymer layers, there is interposed a soft extendable adhesive to provide a weak bonding or adherence therebetween. This will cause the formation of a high-strength, cross-laminated film which, when one film layer of the cross-laminated film is caused to tear along the direction of orientation thereof, the force of the tear is transferred to and dispersed over a relatively large area of the adjacent film layer, the orientation of which is extremely strong in that particular direction, thereby inhibiting any continued tearing of the laminated film material.

The utilization of a counter-rotating die to form the cross-laminated film web is of particular advantage in that the orientation of the film during extrusion thereof is generally twisted so as to produce a diagonal orientation. Although this can be carried out by rotating an extrusion die while extruding the thermoplastic material and concurrently restraining the upper end of the resultant extruded film bubble to prevent it from rotating, this is difficult to carry out in actual practice inasmuch as the film would be subjected to a substantial torque tending to cause the film bubble to collapse. However, upon constructing the tubular extrusion die as a hollow member, and arranging a further counter-rotating die within the first-mentioned die, this causes the interior film layer to be diagonally oriented in an opposite direction to the outer film layer, and upon joining of the film layers into a laminate, the torque of the two layers reacts against each other so as not to impart any net torque on the laminate film bubble.

However, notwithstanding the advantages over the prior art which is attained through the intermediary of the cross-laminated tubular film web having a center layer of a soft extendable adhesive, this still may not fully meet consumer needs through the provision of a cross-laminated film possessing all of the desired physical properties as to strength and resistance to tearing. The reason for this may be traced back to an inherent desire in a consumer to be able to perceive the film product as being heavy and substantial to touch and in handling. This creates a distinct impression of the film being heavy or thick and possessed of a high degree of durability and inherent strength.

SUMMARY OF THE INVENTION

Accordingly, it is a basic object of the invention to provide a three-layer, cross-laminated tubular film of the type described, in which the center layer of the laminate film structure, rather than being constituted from a soft extendable adhesive as described in applicant's copending application, is constituted of a foamed material. For example, such foamed material may consist of a foamed EVA copolymer, foamed polyethylene or polyisobutylene-based adhesive, whereby the foaming can be effectuated through the intermediary of a chemical blowing agent, such as Celogen (registered trademark), or through direct injection of nitrogen or carbon dioxide.

The interposition of the foamed material layer between the outer film layers will produce the desired bond between the adjoining film layers, while concurrently imparting the necessary film thickness to the laminate.

Accordingly, it is a primary object of the present invention to provide a novel method of producing a high-strength cross-laminated tubular thermoplastic film with a foam core material.

Another object of the present invention is to provide a method of forming a high-strength cross-laminated tubular thermoplastic material of the type described herein, through the utilization of counter-rotating extrusion dies, and with the concurrent interposition of a foam material or foamed adhesive between the outer film layers during extrusion thereof in order to produce a bond between the superimposed film layers.

Still another object of the present invention is to provide a novel high-strength cross-laminated tubular thermoplastic film material which has the layers bonded by a foamed adhesive material forming a bond between the film layers.

Another object of the present invention is to provide a high-strength cross-laminated tubular thermoplastic film material in which the laminated film possessing a foam core is produced by the above-described inventive extrusion method.

BRIEF DESCRIPTION OF THE DRAWINGS

Reference may now be had to the following detailed description of an exemplary embodiment of the invention, taken in conjunction with the accompanying drawings; in which.

DETAILED DESCRIPTION

Figure 1:
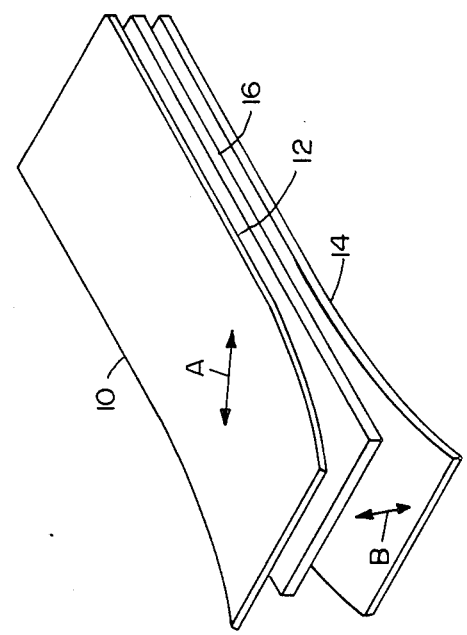
FIG. 1 illustrates, in a perspective exploded view, a portion of a high-strength cross-laminated thermoplastic film material with foam core which is produced by the inventive method.

Referring specifically to FIG. 1 of the drawings, the thermoplastic high-strength cross-laminated film 10 pursuant to the invention comprises a first film layer 12 which is oriented in a first diagonal direction A transversely of the machine direction (MD) of the extruded material, a second film layer 14 which is oriented in an opposite direction B, substantially normal to the direction of orientation A of layer 12, and with an adhesive foamed material 16 being interposed between the film layers 12, 14. Preferably, the core material forming the foam core 16 is constituted from a foamed polyisobutylene-based adhesive, from a foamed EVA copolymer or a foam adapted to produce a relatively weak bond between the film layers 12 and 14.

Figure 2:
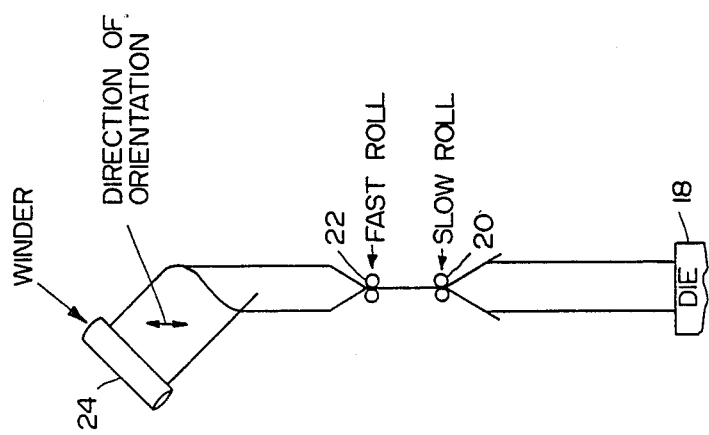
FIG. 2 illustrates a prior art arrangement for producing a cross-laminated thermoplastic film web.

A particular prior art process and apparatus employed in the formation of a cross-laminated film web is illustrated in FIG. 2 of the drawings, which is known in the industry as the so-called Valeron process (Van Leer Plastics). In essence, this process necessitates a tubular thermoplastic film to be extruded from a die 18, with the film tube then being passed and flattened between a pair of slowly rotating rolls 20, and downstream of the latter between a pair of faster rotating rolls 22; thereafter expanded and slit diagonally such that the direction of orientation is diagonal to the direction of travel of the film as it is wound on winder 24; two such diagonally oriented films subsequently being laminated so as to form the cross-laminated multi-ply film web. Although the slit superimposed portions or tube halves of the film material may have their facing surfaces laminated through the intermediary of a soft, extendable adhesive, this requires a manufacturing process consisting of numerous steps which renders the entire procedure complex and somewhat uneconomical.

Moreover, the film thickness for this prior art process must be relatively heavy; for instance, 3 to 4 mils, because of the necessity of forming multiple layers; and the resulting product is a flat sheet which, in order to form the sheet into a bag, necessitates both back and end sealing, neither of which can be a heat seal inasmuch as this would destroy the orientation of the film layers.

Pursuant to the invention, this limitation can be readily obviated by employing counter-rotatable extrusion dies to form the cross-laminated film, with the concurrent application of a foamed adhesive material between the layers during extrusion so as to produce a weak bond between the layers of the film tube.

Figure 3:
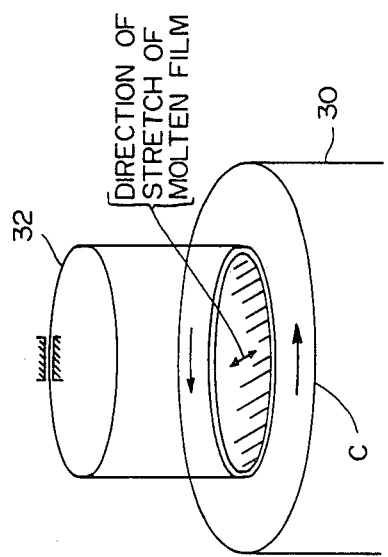
FIG. 3 illustrates an extrusion apparatus for forming an oriented tubular thermoplastic film web.

Referring to FIG. 3 of the drawings, when a molten film is drawn away from an extrusion die 30, an orientation is produced in generally the direction of stretching of the film, usually in the machine direction (MD) of the film. However, if the molten tube were to be twisted by rotating the extrusion die 30 in the direction of arrow C, then the film orientation becomes diagonal. This can be effected by restraining the upper end of the film tube or bubble 32 in order to prevent the latter from rotation at that point, and with the die tangential speed being equal to the take-off speed of the final film, the principal direction of orientation would normally be 45° relative to the machine direction of the film. However, in actuality, this would be rather impractical inasmuch as the film bubble would be subjected to a substantial torque during stretching, thereby causing the bubble to collapse.

Figure 4:
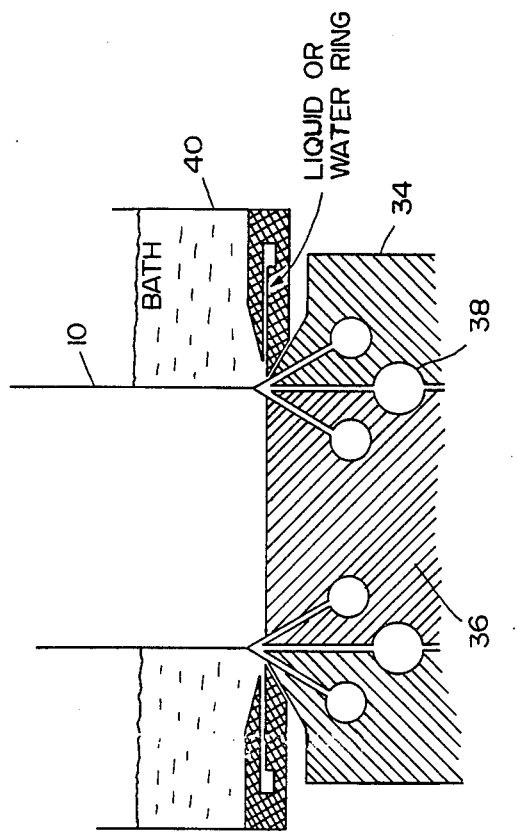
FIG. 4 illustrates a generally diagrammatic cross-sectional view through a counter-rotating extrusion die arrangement for producing the cross-laminated thermoplastic film web with a foamed adhesive material core pursuant to the present invention.

However, by modifying the rotating die of FIG. 3 to provide a hollow multiple extrusion die substantially as shown in FIG. 4, this would largely eliminate the particular problems which are encountered in imparting a torque to the extruded film bubble or tube.

Thus, an outer annular extrusion die 34 is rotatable in a generally clockwise direction, whereas an inner annular extrusion die 36 is rotatable in a counterclockwise direction, imparting oppositely directed orientations (orientations A and B in FIG. 1) to the two film layers being extruded by the respective dies. Simultaneously, a foamed adhesive material 16 is applied to the facing surfaces of the film layers 12, 14 being extruded through an annular passageway 38 extending between the discharge lips of the annular dies 34, 36, with such adhesive material being generally a foamed EVA copolymer, foamed polyethylene or a foamed polyisobutylene-based adhesive which produces a strong bond or degree of adherence with the adjoining film layers, but a relatively weak degree of bonding between the film layers per se because of the weak adhesive material layer due to its foamed nature, while imparting a heavy or substantial feel to the laminate possessing the foamed core.

Pursuant to a modification of the invention, rather than extruding the adhesive through the annular passageway intermediate the discharge lips of the annular dies 34, 36, the foamed adhesive material 16 may be coextruded with one of the film layers 12 or 14 on the surface of the film layer facing towards the other film layer. Upon contacting such other film layer, the foamed adhesive material 16 will then produce a weak bond and, resultingly, join the film layers to form a laminate. Alternatively, the foamed adhesive material 16 may be coextruded with both film layers 12, 14 on the surfaces thereof facing each other. When the respective foamed adhesive material portions on each of the film layers contact each other, they will adhere to each other so as to produce the weak bond between the film layers as required by the invention.

In order to maintain and preserve the orientation which is produced in the polymer melt during the extrusion of the film layers, rapid cooling may be imparted to the external peripheral surface of the formed tube by positioning a liquid or water ring 40 providing a liquid bath in proximity to the extrusion die orifices, causing the film to freeze as quickly as possible to there minimize relaxation thereof. Although the cooling liquid employed for the liquid bath is generally water, it is readily contemplatable that other kinds of liquid may be used for cooling the extruded laminated film web. For example, the liquid may comprise ethylene glycol which possesses a higher boiling point than water, when it is desired to have the bath at temperatures higher than 212° F.; or may be a mixture of water and ethylene glycol, although this may necessitate the subsequent rinsing or washing of the extruded film web.

Furthermore, suitable bubble pressure may be imparted to the extruded laminate whereby each particle of film leaving the extrusion die has both a vertical and a horizontal force component acting thereon, to thereby produce a diagonal resultant. The horizontal component attempts to cause the bubble to be reduced in diameter, but in order to resist the foregoing, the internal bubble pressure is maintained high, but is not sufficient to rupture the film at a different place in the bubble. Thereby, by freezing the film due to the action of the liquid or water bath 40 proximate the die orifice, sufficient strength is imparted to the thermoplastic material to cause the bubble to resist such pressure over its extruded length.

The foamed material adhesive 16 forming a weak bond between the film layers 12, 14 can be constituted of a foamed polyisobutylene-based adhesive or from a foamed EVA polymer supplied through the annular passageway 38 intermediate the two concentric annular extrusion dies 34 and 36; such as by the employment of a chemical blowing agent; for instance, Celogen (registered trademark); or by direct injection of nitrogen or carbon dioxide. This can be carried out by means of an adhesive pump adapted for foamed adhesives, employing the direct injection of a gas, in effect, creating a three-layer forming extrusion die in which the central adhesive material layer 16 is sheared within the die lips.

The foregoing provides a relatively simple method of forming a high-strength cross-laminated thermoplastic film web with a foamed core which is economically produced, and which is adapted to form extremely strong and heavy-feeling bags or other types of film webs providing a high resistance to any tearing in the cross-directions of the film.

While there has been shown and described what is considered to be a preferred embodiment of the invention, it will of course, be understood that various modifications and changes in form or detail could be readily made without departing from the spirit of the invention. It is therefore intended that the invention be not limited to the exact form and detail herein shown and described, nor to anything less than the whole of the invention herein disclosed as hereinafter claimed.

What is claimed is:

1. A high-strength, cross-laminated tubular thermoplastic film material with a film core, comprising an outer film material layer and at least one inner film material layer, each said layer of film material being uniaxially oriented in a generally different direction with regard to each other; and a foamed adhesive material being interposed between said film layers so as to produce a bond therebetween.

2. A film material in claim 1, wherein said layers of said thermoplastic film material are oriented substantially normal to each other.

3. A film material as claimed in claim 1, wherein said layers of said thermoplastic film are oriented at oppositely directed angles relative to the machine direction of said film material.

4. A film material as claimed in claim 1, wherein said adhesive material is essentially constituted of a foamed polyisobutylene-based adhesive.

5. A film material as claimed in claim 1, wherein said adhesive material is essentially constituted of a foamed EVA copolymer.

6. A film material as claimed in claim 1, wherein said adhesive material is essentially constituted of a foamed polyethylene.

7. A film material as claimed in claim 1, wherein said thermoplastic material comprises a high density polyethylene.

8. A method of forming a high-strength, cross-laminated tubular thermoplastic film material possessing a foam core comprising extruding a polymeric material in a substantially molten condition through at least two concentric annular extrusion dies; imparting relative rotation between said annular dies so as to orient each layer of extruded film material in generally different directions with respect to each other; and concurrently interjecting a foamed adhesive material between said film layers during extrusion thereof so as to produce a bond therebetween.

9. A method as claimed in claim 8, wherein said layers of said thermoplastic film material are oriented substantially normal to each other.

10. A method as claimed in claim 8, wherein said layers of said thermoplastic film are oriented at oppositely directed angles relative to the machine direction of said film material.

11. A method as claimed in claim 8, wherein said annular extrusion dies are counter-rotated during the extrusion of the layers of said molten polymeric material, said foamed adhesive material being applied to the facing surfaces of said extruded film material intermediate said extrusion dies.

12. A method as claimed in claim 11 wherein said foamed adhesive material is sheared between said annular extrusion dies during application thereof to the facing surfaces of the layers of said polymeric material.

13. A method as claimed in claim 8, wherein said annular extrusion dies are counter-rotated during the extrusion of the layers of said molten polymeric material, said foamed adhesive material being coextruded with at least one of the layers of said polymeric material on the surface thereof facing towards the other layer so as to form a bond therewith upon contacting said other layer.

14. A method as claimed in claim 13, wherein said foamed adhesive material is coextruded with both layers of said polymeric material on the surfaces of the layers facing each other so as to cause the foamed adhesive material portions on said respective layers to produce an adhesive bond upon contacting each other.

15. A method as claimed in claim 11, wherein said foamed adhesive material is applied through the application of a chemical blowing agent.

16. A method as claimed in claim 11, wherein said foamed adhesive material is applied through the direct injection of a gas.

17. A method as claimed in claim 16, wherein said gas comprises nitrogen.

18. A method as claimed in claim 16, wherein said gas comprises carbon dioxide.

19. A method as claimed in claim 8, wherein said adhesive material is essentially constituted of a foamed polyisobutylene-based adhesive.

20. A method as claimed in claim 8, wherein said adhesive material is essentially constituted of a foamed EVA copolymer.

21. A method as claimed in claim 8, wherein said adhesive material is essentially constituted of a foamed polyethylene.

22. A method as claimed in claim 8, wherein said polymeric material comprises a high density polyethylene.

23. A method as claimed in claim 8, wherein the orientation in said film material layers and the adhesion with said foamed adhesive material is set by cooling said extrudate in a liquid bath immediately upon egress from said extrusion dies so as to minimize relaxation of the film layers.

24. A method as claimed in claim 23, wherein said liquid bath employs water as a cooling liquid for said extrudate.

25. A method as claimed in claim 23, wherein said liquid bath employs ethylene glycol as a cooling liquid for said extrudate.

26. A method as claimed in claim 23, wherein said liquid bath employs a mixture of water and ethylene glycol as a cooling liquid for said extrudate.

* * * * *